(No Model.) 6 Sheets—Sheet 2.

C. J. VAN DEPOELE.
CLOSED SLOTTED CONDUIT FOR ELECTRIC RAILWAYS.

No. 405,628. Patented June 18, 1889.

(No Model.) 6 Sheets—Sheet 3.

C. J. VAN DEPOELE.
CLOSED SLOTTED CONDUIT FOR ELECTRIC RAILWAYS.

No. 405,628. Patented June 18, 1889.

Witnesses
H. A. Lamb
O. L. Sturtevant

Inventor
Charles J. VanDepoele
By his Attorney
Frankland Jannus

(No Model.) 6 Sheets—Sheet 4.

C. J. VAN DEPOELE.
CLOSED SLOTTED CONDUIT FOR ELECTRIC RAILWAYS.

No. 405,628. Patented June 18, 1889.

Witnesses
H. A. Lamb
C. L. Sturtevant

Inventor
Charles J. Van Depoele
By his Attorney
Frankland Jannus (No Model.) 6 Sheets—Sheet 5.

C. J. VAN DEPOELE.
CLOSED SLOTTED CONDUIT FOR ELECTRIC RAILWAYS.

No. 405,628. Patented June 18, 1889.

Witnesses
H. A. Lamb
C. L. Sturtevant

Inventor
Charles J. VanDepoele
By his Attorney
Frankland Jannus (No Model.) 6 Sheets—Sheet 6.

C. J. VAN DEPOELE.
CLOSED SLOTTED CONDUIT FOR ELECTRIC RAILWAYS.

No. 405,628. Patented June 18, 1889.

Witnesses
Inventor
Charles J. Van Depoele
By his Attorney

UNITED STATES PATENT OFFICE.

CHARLES J. VAN DEPOELE, OF LYNN, MASSACHUSETTS.

CLOSED SLOTTED CONDUIT FOR ELECTRIC RAILWAYS.

SPECIFICATION forming part of Letters Patent No. 405,628, dated June 18, 1889.

Original application filed January 5, 1889, Serial No. 295,506. Divided and this application filed April 2, 1889. Serial No. 305,729. (No model.)

*To all whom it may concern:*

Be it known that I, CHARLES J. VAN DE-POELE, a citizen of the United States, residing at Lynn, in the county of Essex and State of Massachusetts, have invented certain new and useful Improvements in Closed Slotted Conduits for Electric Railways, of which the following is a description, reference being had to the accompanying drawings, and to the letters and figures of reference marked thereon.

This application is a division of the application filed January 5, 1889, Serial No. 295,506.

My invention relates to improved means for supporting, protecting, and insulating a supply conductor or conductors for electric railways or analogous use; and it consists in an improved form of sub-surface conduit, in which the supply-conductor is carried, traveling contact being made with said conductor by a metallic contact device extending through a continuous surface-slot formed in the exterior casing of the conduit, which said slot is kept normally closed by elastic water-proof strips secured under each edge thereof and pressed together, so as to exclude water, dirt, stones, and the like. Said strips, on account of their nature, form, and position, are capable of being sufficiently separated by the traveling plow to admit of its passage, without at the same time permitting water or other objectionable matter to enter the conduit.

My invention may be carried out in a great variety of ways, several specific forms of conduit and of material available for the particular character of slot-closing media being shown in the accompanying drawings.

Figures 1, 2, 3, 4, 5:
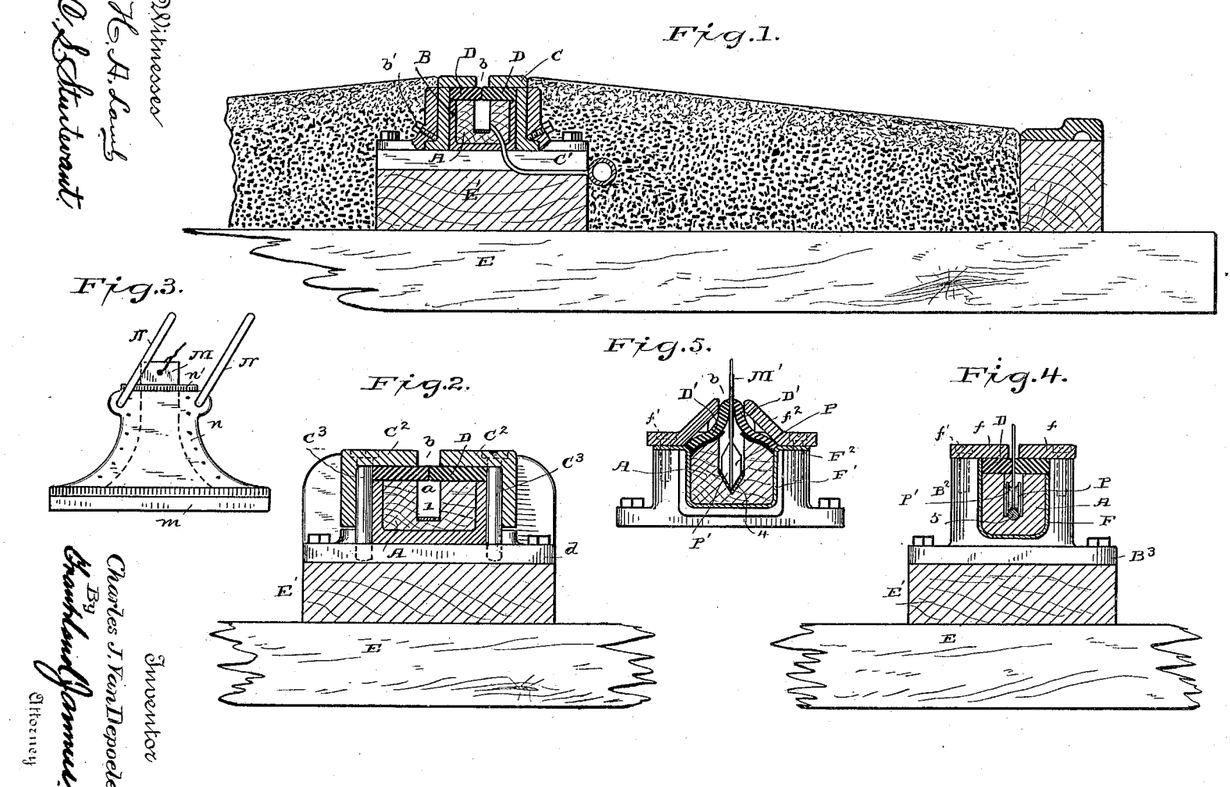
Figure 1 is a transverse sectional elevation showing part of the road-bed of an electric railway and a form of conduit embodying my invention.
Fig. 2 is a transverse sectional elevation showing a slightly-different form of conduit, together with its immediate supports.
Fig. 3 is a detail view in elevation, showing a contact-plow adapted for use in connection with the conduit seen in Figs. 1 and 2.
Fig. 4 is a transverse view in elevation, partly in section, showing a form of conduit.
Fig. 5 is a view similar to Fig. 4, embodying a slightly-different construction.

As indicated in the drawings, my improved conduit comprises an exterior metallic body or casing, which may be formed, as indicated in Figs. 1, 2, 6, and 7, of separate continuously-united sections of channel-iron, within which is inclosed the continuously-connected conductor-supporting filling or lining A, of wood or other insulating material, formed at its upper side with a channel or groove *a* to receive the bare conductor 1, of copper or other suitable metal. In Fig. 1 a grooved wooden strip A is laid in a trough-shaped iron casing B. The casing B is continuously connected, as will appear, and is enveloped on either side by similarly-continuous bars of Z-shaped angle-iron C, which extend along the sides of the trough B and inward over its upper edges. The inner edges of the surface-bars or capping-plates C are separated above the groove *a*, to form the continuous surface-slot *b*, through which the contact devices enter the groove *a*. The bars C are supported upon suitable chairs C', placed at convenient distances along the line of the conduit. Before the bars C are secured in position continuous strips of elastic non-conducting packing D are laid horizontally along the upper edges of the groove $a$ upon the wood A, with their inner edges in contact, when they are secured in position and the parts firmly united by securing the angle-irons C firmly in their supporting-chairs—as, for example, by set-screws which pass through the chairs and press against the lower parts of the angle-irons C in a downwardly-oblique direction, so as to force said angle-irons closely against the sides of the trough B, and at the same time firmly secure the packing-strips D D in position with their edges in close and practically water-tight contact.

As seen in Fig. 2, the angle-irons $C^2$ are L-shaped instead of Z-shaped, as in the previous instance, and are held in place by vertical screw-bolts $C^3$ passing downwardly and into a transverse iron plate $d$, forming the base of the chair, by which the conduit is supported at intervals. The conduit as a whole, being but four or five inches in height, if built directly upon the cross-ties E, would not ordinarily extend as high as it is desirable to have the surface of the roadway between the tracks in order to drain surface water away from the conduit, and I therefore find it convenient in construction to place the conduit-supporting chairs upon a continuous wooden stringer E′, placed longitudinally upon the cross-ties and appropriately secured thereto. A further advantage of the use of the stringer E′ consists in the fact that, the conduit being supported thereby, the cross-ties E may be replaced or removed without in any way disturbing the conduit structure.

Figure 6:
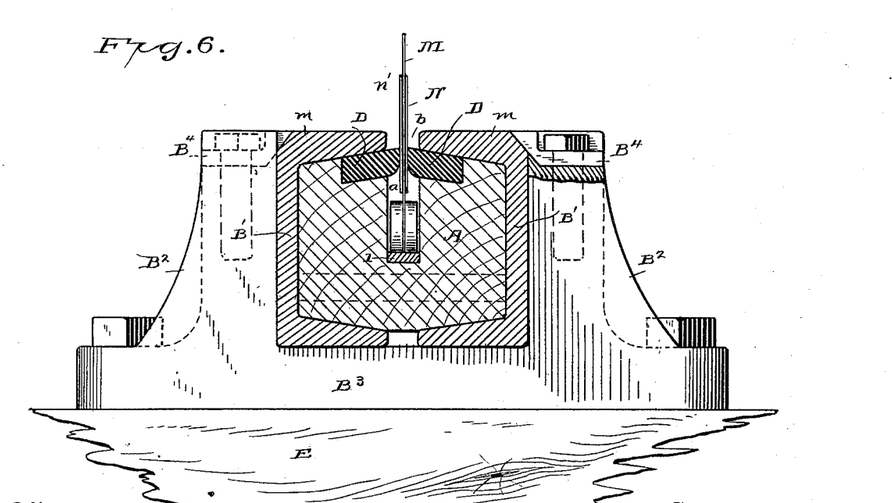
Fig. 6 is a transverse elevation, partly in section, showing another form of conduit-casing.
Figure 7:
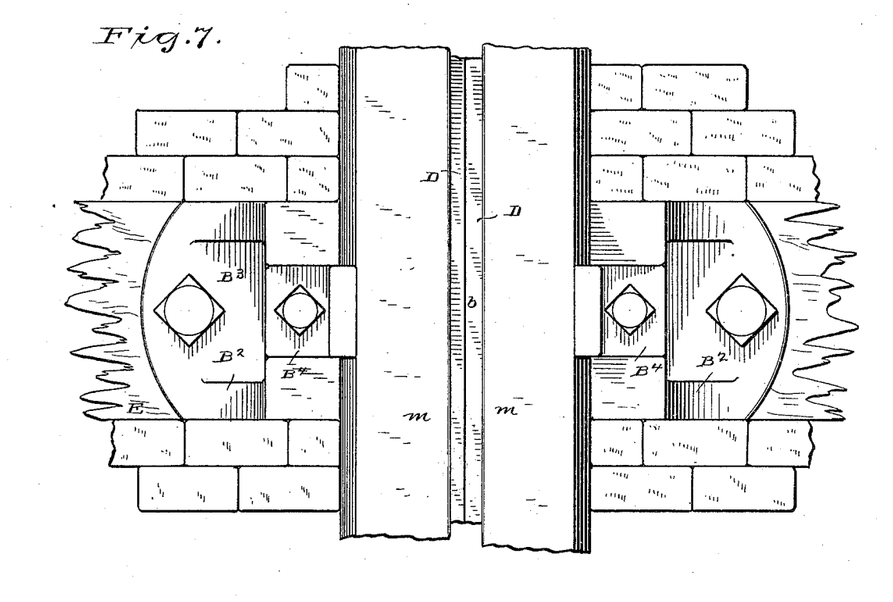
Fig. 7 is a plan view showing the conduit and one of the supporting-chairs in place.

As seen in Fig. 6, the grooved wooden bar A is formed with additional rabbets or recesses along its upper edges for the reception of the elastic packing D D, and is incased or inclosed by two trough or U shaped iron bars B′ B′, placed edgewise and forced upon the wood A, so as to inclose it and the packing D D tightly, the wood with its casing of iron being then placed between the upright arms $B^2 B^2$ of the chair $B^3$, by which the conduit is supported. Removable plates $B^4$ are bolted down on top of the arms $B^2 B^2$, with their inner edges projecting over the corners of the iron casing B′ B′, so as to hold it firmly in position, the exposed upper sides of said casing forming the surface or capping plates of the conduit. This construction is extremely simple and strong, and has the advantage that when the upper surfaces of the casing B′ B′ become worn they can be removed from the central wooden portion A and reversed.

With the angle-iron casing just described the conduit can readily be constructed from standard materials; but it is in many cases desirable to use a special form of metallic exterior protection. For example, as seen in Fig. 4, the insulating grooved conductor-support A is completely inclosed within a metallic trough F, which is made high enough at the sides to also contain the horizontal packing-strips D D. The trough F is contained within a metallic chair $B^3$, and is secured in position by continuous removable capping-plates $f\ f$, which are separated to form the surface-slot $b$, and are firmly secured to the upper parts of the arms $B^2 B^2$ on the chair by suitable bolts $f'$, and while acting to protect the said packing-strips and the interior of the conduit the plates $f$ also compress the strips D D into close edge contact with each other and hold them firmly in that position.

A form differing slightly from the above is shown in Fig. 5, in which the trough F′ is made somewhat shallower than the trough F, and has its upper edges $F^2$ bent outwardly, so as to rest upon the upper ends of the arms $B^2 B^2$ of the chair. In this instance the capping-plates $f^2$ are inclined upwardly and the packing-strips D′ D′ arranged to extend upwardly and to make an oblique instead of a horizontal contact. This form is especially desirable where the roadway between the tracks is paved with asphalt, since the covering can then be brought up to the upper edges of the upwardly-inclined capping-plates $f^2$ and a very small surface thereof be exposed to wear.

Figure 8:
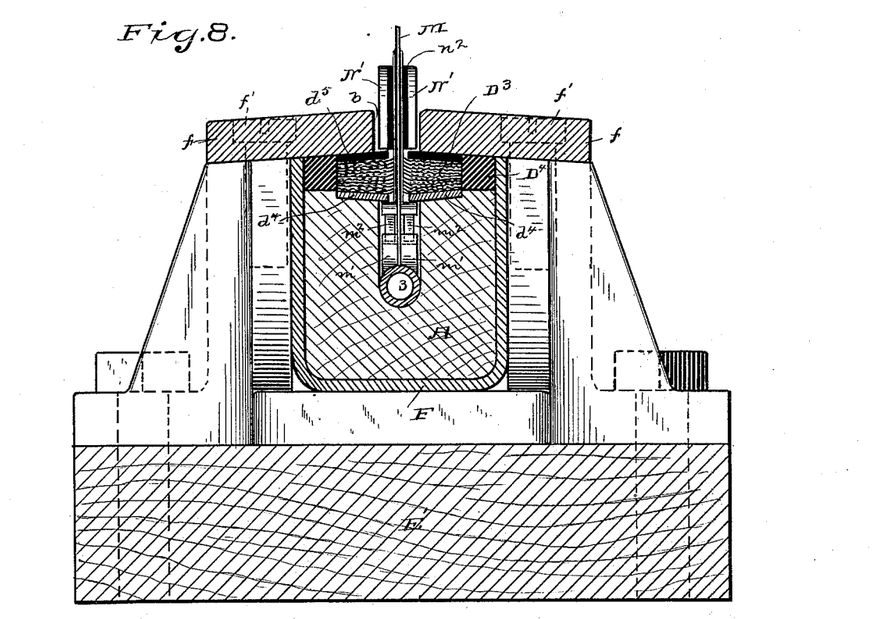
Fig. 8 is a transverse elevation, partly in section, showing a somewhat different construction of conduit and packing.

The construction seen in Fig. 8 does not vary materially from that seen in Fig. 4, except in the details of the slot-closing packing.

As seen in the various figures above referred to, the conduit may be constructed with several pieces of angle-iron secured about a continuous wooden strip or bar the size of ordinary scantling, to form a metallic case protected and closed at its top edges by the necessary surface or capping plates, which must be quite heavy to stand the wear and tear of traffic. In all instances where wood is employed it is to be thoroughly soaked, saturated, or coated with preservative compound for rendering it impervious to water and preventing decay. I do not, however, confine myself to the use of wood as a conductor supporting and insulating medium, since a tube or trough of any desired shape may be employed. Said tube or trough, being provided with an insulating-lining, may itself form the support for the conductor, as seen in Fig. 18.

Figure 18:
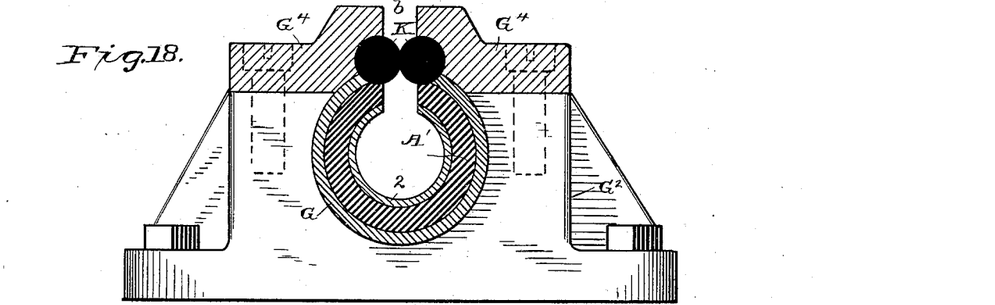

In Fig. 18 the conductor 2 is in the form of a slotted tube of less diameter than a slotted inclosing and protecting tube G, the space between the conductor and protecting-tubes being filled with some plastic insulating material A′ while in a liquid state—as, for example, bitumen. The tube G is supported at desired intervals by chairs $G^2$, which are provided with upwardly-extending arms or parts $G^3$, upon the upper surface of which are secured surface-plates $G^4$, separated to form a continuous narrow slot centrally above the slot in the tube G and its insulated lining. The bars $G^4$ are desirably undercut at their under edges to admit of the insertion of continuous strips of cylindric or other form of packing K, by which the opening into the tube G is normally closed.

Figure 17:
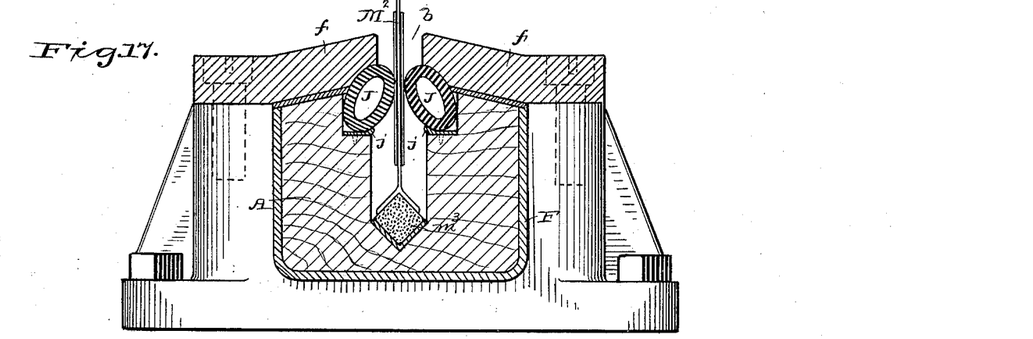

The form seen in Fig. 17 does not differ materially from that seen in Fig. 8, except as to the shape of the conductor and slot-closing devices, which are hollow rubber tubes J, in place of the solid forms seen in other figures.

Figure 19:
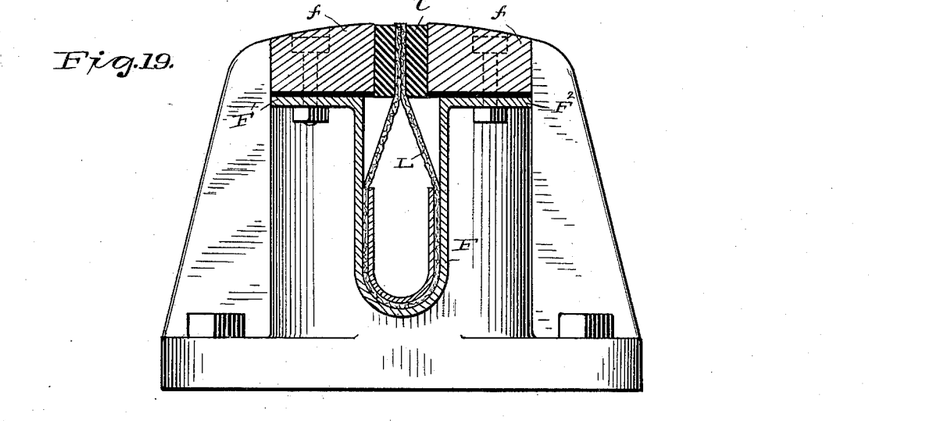

The conduit seen in Fig. 19 resembles that seen in Fig. 4, except that the U-shaped protecting metallic casing has its upper edges turned outwardly, as at F′ F² in Fig. 5, and is finished with flat horizontal surface-plates $f$ $f$, as in Fig. 4. The U-shaped casing is completely lined with canvas L or other strong durable fabric properly coated with insulating material and joined to the packing, thus forming a continuous closed chamber, in the lower part of which the conductor is placed.

The parallel strips of elastic packing, by which the surface-slot of my improved conduit is closed and the water excluded, may be composed of a great variety of materials within the limits of the principal requirements— elasticity, freedom from abrasion by the passing contact-plow between their adjacent edges, freedom from injury by water, and good insulating properties, since the said packing must not only exclude water, but also serve as insulation or additional insulation between the exterior of the conduit and the surface-plates and casing. In many cases flat strips of pure rubber alone may be utilized for this purpose, which form is indicated at D D in Figs. 1, 2, 3, 5, 6, and 7. This form of packing is unexcelled for insulating and waterproofing qualities, and when molded in strips of the proper size, having smoothly-finished inner edges, which may be lubricated by a coating of dry plumbago, will give excellent results. Rubber, however, being comparatively very expensive, I propose to use as a substitute therefor various combinations of other materials which I find well suited to the purpose.

Figures 12, 14:
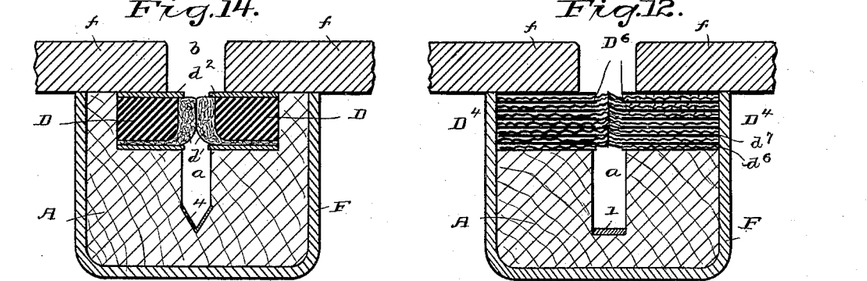
Figure 13:
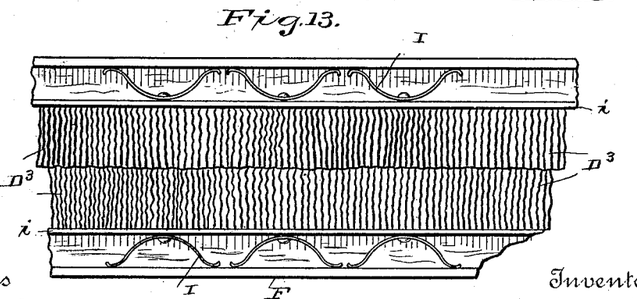
Figure 15:
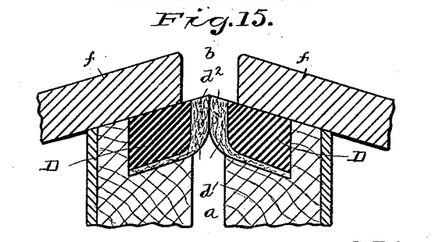
Figure 16:
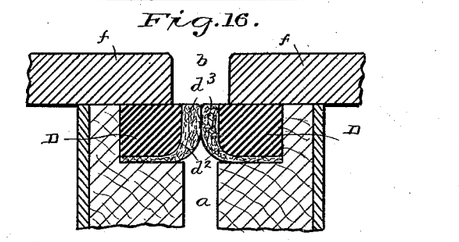

A very desirable form of packing is composed of strips $d^2$ formed of rubber D, with a facing $d'$ of leather, as seen in Figs. 14 and 15, or of canvas $d^3$, as in Fig. 16. With this form the rubber supplies the necessary flexibility and elasticity and the leather or canvas facing increased durability. The leather or canvas should be secured to the rubber by an impervious cement, after which the facing can be thoroughly lubricated with an undrying oil mixed with plumbago, or with the former or latter alone. The oil will also prevent the leather being affected by moisture.

In Fig. 8 are seen packing-strips $D^3$, built up of a number of thicknesses of any strong fabric, as canvas, cotton-duck, or similar material, said layers being thoroughly impregnated with water-proof insulating compound and laid upon and supported by metallic strips $d^4$, attached to the upper edges of the grooves in the wood A, and acting to protect the under sides of the said strips from abrasion by the contact device. Upon the upper side of these strips are placed protecting-strips $d^5$ of good insulating material—such, for example, as vulcanized fiber. Strips of leather $D^4$ are also used in connection with this fibrous packing, the rubber strips being placed in rear thereof, so as to force their inner edges together, at the same time permitting them to yield, if necessary, on the passage of the contact devices. The fibers at the inner edges of the strips $D^3$ should be unraveled to form a continuous brush, which will possess considerable elasticity, and also hold lubricating material, which at the same time will act to render the said inner edges proof against the entrance of water.

Figures 10, 11:
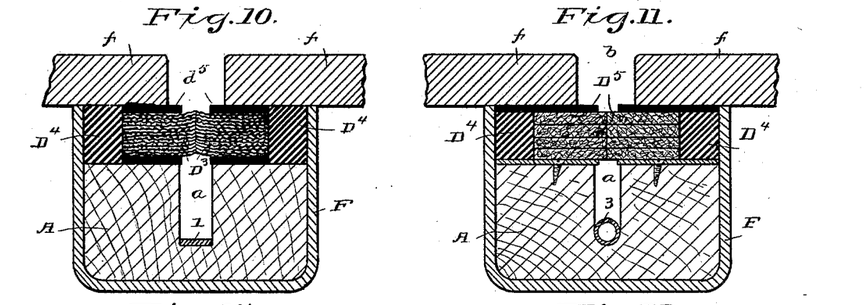
Figs. 10, 11, 12, 13, 14, 15, 16, 17, 18, and 19 are detail views showing the conduit or upper part thereof in transverse section, and illustrating different forms of slot-closing packing.

Different forms of fibrous packing backed by rubber acting to impart the necessary lateral pressure and elasticity are seen in Figs. 10, 11, and 12.

In Fig. 10 the built-up fibrous strips $D^3$ are sustained between upper and lower facings $d^5$, of hard insulating material, to which the fibrous material of the strips $D^3$ may be united by cement, sewing, or otherwise. The adjacent edges of the strips $D^3$ are held tightly together by rubber springs $D^4$, located in rear thereof.

In Fig. 11 packing-strips $D^5$ are seen, which said strips are formed of a number of layers of leather secured together and having their inner edges slitted or roughened to impart flexibility thereto. Additional elasticity is in this case also secured by means of the rubber backing-springs $D^4$.

In Fig. 12 are represented packing-strips $D^6$, composed of alternating layers of rubber and fabric, the rubber not extending quite to the inner adjacent edges. The fabric and rubber are securely united, as by stitching or cement, and the rubber will add to the strength and durability of the strip when completed, as its presence will counteract the tendency of the fabric to ravel, except at the edges, where it is left free for that purpose. In this form of strip the rubber and fabric are so combined that the rubber will impart sufficient elasticity to the strips as a whole without being exposed to the wear of the passing traveler. The said strips are built up of alternate layers of rubber $d^6$ and fabric $d^7$, the laminæ of rubber extending not quite to the edge of the fabric, so that the inner edge of the fabric may become raveled to form a brush. This brush should be thoroughly lubricated with plumbago or some other material that will not affect the rubber, and if tightly pressed together in the first instance will form a very good means for closing the slot, which will be at the same time inexpensive and durable. Instead of the rubber packing $D^4$ shown in the several figures as a means for forcing the slot-closing material together, I may use flat steel springs I, acting against the inner sides of the casing of the conduit and against a continuous wooden or metallic strip $i$, located in rear of the fibrous packing-strips. The said packing-strips, possessing some elasticity in themselves, will yield enough to close about the front and rear of the contact-plow, and thus exclude water.

As seen in Fig. 17, a conduit of the kind described is provided with a packing consisting of two rubber tubes J, pressed and held together by their position between the wood A and the under sides of the capping-plates $ff$. The tubes J may be secured in position by metallic strips $j$, having upturned inner edges; or the said tubes may be held in place by suitable adhesive material.

In Fig. 18 is seen a slot-closing device comprising two hempen or other ropes K, desirably of the woven variety. The said ropes are held in undercut recesses in the wood A and capping-plates $G^4$, and are thoroughly coated with tallow and plumbago or other suitable substance, which will fill all the interstices and permit them to be pressed together to form a closed slot.

In Fig. 19 is seen a canvas lining L within the conduit and enveloping the conductor, the upper edges of said lining being brought up to the surface and cemented or otherwise attached to continuous rubber strips 1, which strips are secured directly to the capping-plates $ff$. The inner surfaces of the edges of the canvas may also be provided with a strip or facing of leather, with which form the rubber, canvas, and leather should be attached and connected by some insoluble cement, after which the faces of the leather may be lubricated without fear of injuring the rubber.

Many different forms of conductor may be used with my improved conduit, some of which are herein illustrated.

As seen in Figs. 1, 2, 6, 10, 12, and 20, the main supply-conductor 1 is formed of a flat strip of metal, which may be of copper or iron faced with copper, or of other good conducting metal. In connection with the flat conductor I may use a contact device similar to that shown in Fig. 3, in which is represented a plate or bar M of conducting metal secured to or provided at its lower edge with a rubbing shoe or shoes $m$, for actual contact with the surface of the conductor. Wheels or brushes may be substituted for the rubbing-shoe; but I find the latter desirable in many instances on account of its cheapness and durability and the fact that a rubbing contact is in many instances preferable. The shoe $m$ is removable, so that by replacing the shoes when worn the traveling contact may last indefinitely.

As seen in Fig. 3, the vertically-extending part of the traveling contact comprises a plate or strip of conducting metal M, which may be in the form of a steel blade made as thin as consistent with the desired strength. To the lower edge of this blade is secured the shoe $m$ referred to, and to its upper portion the links N or other devices by which it is mechanically connected to the moving vehicle. Said blade is, moreover, inclosed within an outer protective casing $n$, between which and the conducting-plate M mica or other thin insulating material $n'$ is interposed, the whole forming a comparatively thin plate capable of moving between the elastic slot-closing material, and the said contact device should not exceed in thickness the distance which the said slot-closing material may be compressed without injury.

Figure 9:
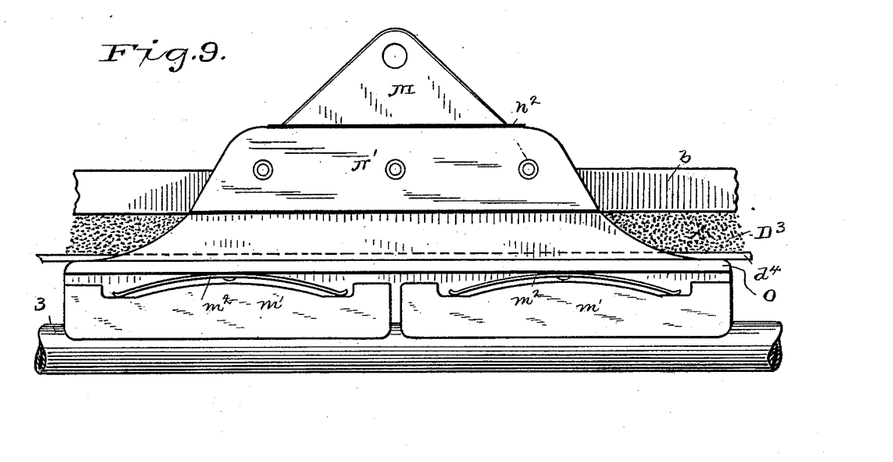
Fig. 9 is a side elevation showing the upper portion of one side of the conduit, conductor, and traveling contact seen in Fig. 8.

In many instances I also provide an exterior protection to that part of the traveling contact which is exposed above the insulating slot-closing packing. Such a form is seen in Figs. 8 and 9, where that portion of the conducting-plate M extending above the slot-closing packing-strips $D^3$ is provided with insulation $n^2$, casing $n$, and exterior protective plates $N'$, which project in front and rear of the plate M, and are solidly united and sloped off at their ends to form plows traveling in the slot between the capping-plates for the purpose of removing stones or other obstructions that might have lodged therein. In said Figs. 8 and 9 a cylindric conductor 3 is seen, which may, if desired, be tubular in structure. To the lower edge of the plate M is secured a narrow strip of metal O, which enters the conduit and presses upward against the under sides of the plates $d^4$, upon which the packing shown in said figures is desirably supported, said strip O also contributing to close the narrow opening between the packing-strips caused by the passage of the plate M. Two or more rubbing-shoes $m'$ are arranged below the strip O, with their under surfaces resting upon the conductor 3, with the form of which they will of course correspond, whether the same be round or flat or any other shape. The shoes $m'$ are connected to the strip O by flexible metallic springs $m^2$, secured to the under side thereof and sprung into suitable recesses in said shoes.

As indicated in Figs. 5, 14, and 17, a V-shaped conductor 4 may be employed, and it will also be understood that the traveling contact devices hereinbefore described may be utilized in connection therewith by suitably shaping the contact-shoes to conform to the shape of the conductor.

Along the lower edge of the plate $M'$ are secured saucer-shaped metallic disks P, which, when united by a central bolt $p$, will form a hollow contact-wheel adapted to run in the grooved conductor. Any desired number of these disks may be provided, so as to insure good electrical connection, and the supporting-plate $M'$ is made narrower along its lower end portions in order that it may possess the lateral flexibility necessary to permit the carriage passing easily and smoothly along grooved or bent portions of the conduit.

A carriage similar to the foregoing is indicated in Fig. 4, the difference being, however, in the shape of the disks of which the contact-wheels are formed, the disks $P'$, of which the traveler in Fig. 4 is composed, being formed and arranged to constitute, when assembled, a number of grooved contact-wheels adapted to travel upon the round conductor 5 there shown. In other respects the travelers, Figs. 4 and 5, are the same.

I do not confine myself to the use of metallic contact devices, and the shoes or rubbing blocks m m' may be formed of carbon with excellent results. Such an arrangement is indicated in Fig. 17, where, as seen, a traveling contact comprising a protected supporting-plate M² of conducting metal is formed with a groove along its under side, within which are secured shoes m³ of carbon, which are suitably beveled along their under sides to conform to the shape of the V-shaped conductor 4 shown. The conductors, of whatever form, are made into sections and united by slip-joints to prevent buckling or other injury from expansion and contraction with change of temperature.

Figure 21:
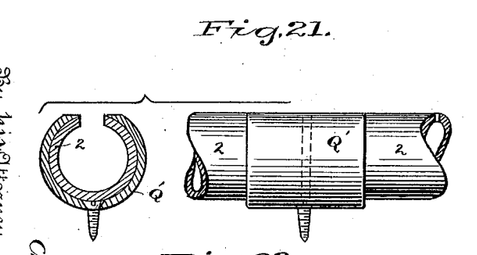
Fig. 21 shows in side elevation and end view, respectively, means for electrically connecting one form of conductor used.
Figure 22:
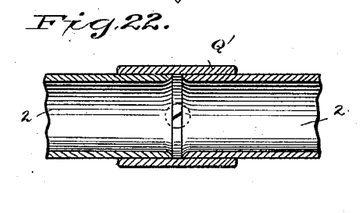
Fig. 22 is a sectional view of the connections shown in Fig. 21.
Figure 24:
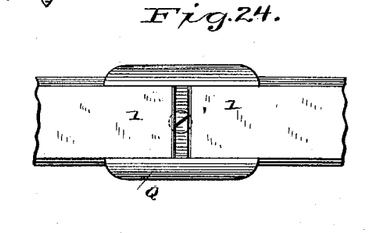
Fig. 24 is a plan view of the connection by which flat conductors are united.
Figure 25:
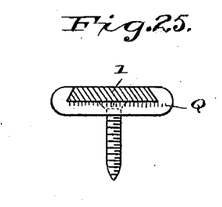
Fig. 25 is a transverse section of the connections shown in Fig. 24.

As seen in Figs. 24 and 25, the flat conductors 1 1 are desirably slightly beveled at their edges, a portion of the extremity of two sections united by being slipped into a clamp or coupling which envelops the conductor on three sides, leaving the upper side perfectly free. The couplings Q are secured at the bottom of the groove $a$ by suitable screws and at desired intervals. A space being left between the united ends of the respective sections of conductor, expansion and contraction may take place without any injury or inconvenience. The sections of the slitted cylindric conductor 2 are joined, as indicated in Figs. 21 and 22, by being inserted in similarly-slitted sleeves Q', which sleeves are themselves secured to the supporting-lining by screws Q² if said support be of wood or similar material. The screws, however, should be omitted when the conductor is supported as indicated in Fig. 18.

As indicated in Fig. 22, the extremities of the sections of conductor 2 should be reduced in thickness from the inside, so as to produce smooth flaring edges in order to prevent any possibility of the traveling contact devices catching in the space between the ends of the sections of conductor.

Figure 23:
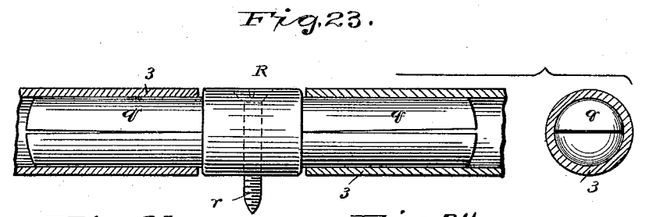
Fig. 23 shows in sectional elevation and end view another form of conductor-connection that may be used.

Fig. 23 illustrates means for uniting sections of tubular conductor 3, which is accomplished by slipping them over the extremities of metallic arms $q$, which extend from a central metallic post R of the same external diameter as the sections of conductor and firmly secured within the conduit by suitable means—as, for example, a screw $r$. The arms $q$ are slitted and forced apart, so that when compressed the sections of conductor slipped into position upon said arms will be outwardly spring-pressed against the interior of the tubular conductor, thus securing good electrical contact. The arms $q$ are of sufficient length to permit the expansion and contraction of the conductor supported thereon.

The exterior metallic casing of my improved conduit, of whatever shape and whether composed of one part or several, as hereinbefore described, is also formed in sections, which should be provided with water-tight joints, which will at the same time permit expansion and contraction between the united sections. A number of the chairs B³ will be required to properly sustain each section of conduit under the heavy loads carried by the vehicles passing along an ordinary street, and said chairs may be of any of the constructions shown in connection with the different forms; but at the points where the sections are united I provide chairs B⁴, which, instead of merely enveloping the conduit-casing closely upon all except the upper side, are formed with a shallow cavity S, extending around on the inside of the middle portion, the extremities T of the interior portion of said chairs fitting the exterior of the metallic casing as closely as is consistent with convenience in inserting the ends of the section of casing to be united. The ends of the sections to be united are placed together in a chair B⁴, sufficient space being left between them to allow for expansion. A strip of canvas or other fabric is desirably placed around the casing to cover the space between its extremities, after which the cavity S in the chair B⁴ is filled with a semi-plastic insulating material—as, for example, bitumen mixed with ashes or some substance which will prevent its becoming hard and brittle. A gasket of soft rubber would answer this purpose extremely well, and is desirable where not too expensive.

Figure 20:
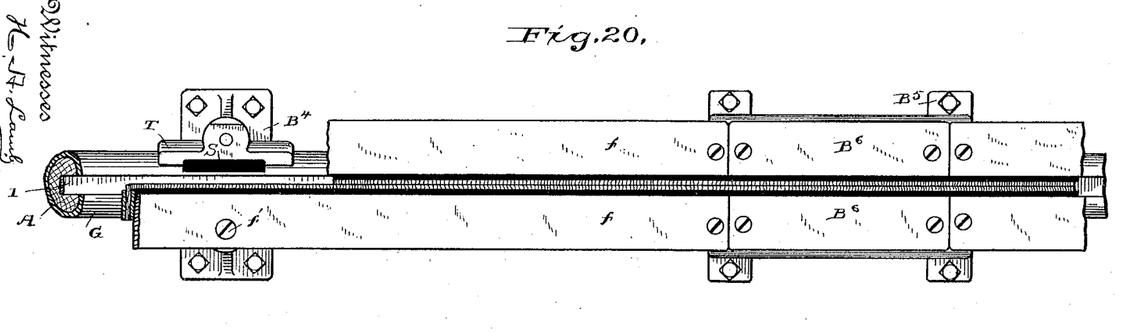
Fig. 20 is a plan view broken away in parts, and illustrating the method of making water-tight expansible joints between the various sections of which the conduit is composed, and also a trap for permitting access to the interior of the conduit.

As heretofore described, the slot of my improved conduit is so tightly closed that removal or insertion of the traveling contact devices is impossible except at points where special provision is made therefor. At such points I provide elongated chairs B⁵, one of which is indicated in Fig. 20. Wherever the chairs B⁵ are placed the lining of the conduit may be partially cut away to enlarge the groove $a$ for a distance of, say, two or three feet, according to the length of the chair B⁵. Short capping-plates B⁶ and corresponding sections of packing-strips are also provided, which, being readily removable, will, when desired, afford an opening to the conduit through which the traveling contact can be inserted or removed. Chairs B⁵, with removable surface-plates, will be placed at desired intervals along the line of the conduit, so that in case of necessity the traveling contact may be removable whenever necessary.

Having described my invention, what I claim, and desire to secure by Letters Patent, is—

1. A closed slotted conduit comprising a protective casing, an insulating-lining therefor, an electric conductor supported within the lining, surface or capping plates forming a part of the casing, metallic chairs for supporting the capping-plates, and continuous strips of insulating material between the capping-plates and the lining for insulating the said lining from the surface-plates and closing the conduit, substantially as described.

2. A closed slotted conduit for electric conductors, comprising an exterior metallic casing formed with a slot along its upper side, an interior insulating-support, a conductor attached to said interior support, and flexible insulating slot-closing strips interposed between the edges of the metallic casing and acting to close the conductor-containing chamber, substantially as described.

3. A closed slotted conduit comprising a slotted metallic tube or chamber extending along the line of way, an insulating-lining within said chamber, a main supply-conductor secured to and supported by the insulating-lining within the conduit, and flexible insulating-strips on the under side of each side of the slot, said strips being normally in contact and acting to close the slot against the entrance of water, substantially as described.

4. A closed conduit comprising a slotted metallic casing extending along the line of way, a slotted insulating-lining within said chamber, a main supply-conductor supported by said insulating-lining, flexible insulating-strips arranged on the under side of each side of the slot between the metallic casing and the interior insulation, the adjacent edges of said strips being normally in contact to close the same, and a traveling contact device engaging the conductor, and a thin plate or extension connected to the contact and extending upward between the edges of the slot-closing strips, substantially as described.

5. A conduit for electric conductors, comprising sections of metallic casing, a chair for supporting and uniting the same formed in part of greater internal diameter than the ends of the sections to be united, and a yielding water-proof packing filling the space between the interior of the chairs and the ends of the sections to be united, substantially as described.

6. A contact device for slotted conduits, provided with non-conducting slot-closing strips, comprising a plate extending through the slot-closing material and elongated at its lower portion, and formed with upwardly-inclined sloping edges for opening the slot with an upward movement, contact devices attached to the lower portion of and moving with said plate, and connections secured to the plate for propelling the said plate along the conduit, substantially as described.

7. A contact device for closed slotted conduits, comprising a protected conducting-plate extending through the slot of the conduit, connections secured to said plate for propelling the same along the conduit, contact devices attached to and moving with said plate and adapted to engage the conductor within the conduit, and a plow secured to the portion of the plate exterior to the conduit and moving upon the exterior thereof, substantially as described.

8. A contact device for closed slotted conduits, comprising a protected metallic plate, connections secured to said plate for propelling the same along the conduit, contact devices attached to and moving with said plate and adapted to engage the conductor within the conduit, and a plow insulated from and surrounding the portion of the conducting-plate exterior to the conduit and moving upon the exterior thereof, substantially as described.

9. A contact device for slotted conduits, provided with non-conducting slot-closing strips, comprising a protected metallic plate extending through the slot-closing material, a contact device attached to the plate for engaging the conductor within the conduit, and protective metallic plates pressing upwardly against the under sides of the opening into the conduit, substantially as described.

10. A contact device for electric conduits, comprising a protected metallic plate, rubbing-blocks attached to the lower extremity thereof and adapted to engage the conductor within the conduit, springs secured to the plate and pressing the blocks downwardly upon the conductor, protective metallic plates pressing upwardly against the under sides of the slot-closing devices, and a plow of insulating material attached to and surrounding the conducting-plate above the slot-closing devices, substantially as described.

11. In a conduit for electric conductors, the combination, with a solid grooved insulating-support, of a conductor in said groove, said conductor formed of sections, and metallic couplings slipped upon and uniting the ends of the sections, substantially as described.

12. A contact device for closed slotted conduits, comprising contacts adapted to engage the conductor or conductors within the conduits, an extension therefrom consisting of a mechanically and electrically protected conductor adapted to be moved between and to support the slot-closing material, substantially as described.

13. A closed slotted conduit comprising a protective casing formed with a slot along its upper side, an interior insulating conductor-support, flexible non-conducting slot-closing strips adjacent to the edges of the protective casing, and springs behind the strips for holding them in contact to close the slot, substantially as described.

14. A closed slotted conduit comprising a protective casing formed with a slot along its upper side, an interior insulating conductor-support, flexible fibrous packing-strips adjacent to the edges of the protective casing, and springs behind the strips for holding them in contact to close the slot, substantially as described.

15. A closed slotted conduit comprising an exterior protective casing, a flexible insulating-lining within the casing, a conductor or conductors inclosed within the lining, and flexible cushions behind the upper edges of the lining for holding the same in contact, substantially as described.

16. A protective casing for slotted conduits, comprising a sheet-metal body or trough, metallic chairs for removably sustaining the body of the conduit, and capping-plates securing the trough in position, said capping-plates being sustained and secured upon the chairs and extending over the said body or trough, substantially as described.

17. A protective casing for slotted conduits, comprising a sheet-metal body or trough formed with lateral flanges, metallic chairs for receiving the body of the conduit, and upon the upper extremities of the arms of which the said flanges rest, and capping-plates resting upon the flanges of the body of the conduit and secured to the chairs, substantially as described.

18. The combination, with the conduit of the class described, of the rail-supporting cross-ties, a continuous longitudinal support also upon said cross-ties, chairs attached to said support at suitable intervals, and the conduit sustained within the chairs, substantially as described.

In testimony whereof I affix my signature in presence of two witnesses.

CHARLES J. VAN DEPOELE.

Witnesses:
FRANKLAND JANNUS,
CHAS. L. STURTEVANT.